(No Model.)

H. L. DAY.
FUEL FEEDER.

No. 603,076.  Patented Apr. 26, 1898.

Witnesses
B. P. Shepherd
W. E. Cooley

Inventor
Henry L Day
F. Paul Hawley
his attorneys

UNITED STATES PATENT OFFICE.

HENRY L. DAY, OF MINNEAPOLIS, MINNESOTA.

FUEL-FEEDER.

SPECIFICATION forming part of Letters Patent No. 603,076, dated April 26, 1898.

Application filed February 11, 1896. Serial No. 578,967. (No model.)

*To all whom it may concern:*

Be it known that I, HENRY L. DAY, of the city of Minneapolis, county of Hennepin, State of Minnesota, have invented certain new and useful Improvements in Fuel-Feeders, of which the following is a specification.

This invention relates to improvements in devices designed for automatically delivering fuel to furnaces; and the objects I have in view are to provide a simple and economical device which may be used for feeding shavings, fine coal, dust, or other light or fine material to furnaces; and the invention consists generally in means for producing an air-belt or continuous air-current, with means for supplying the fuel to the current at some convenient point, and means for separating the fuel from the current and delivering it to the furnace, so that if any of the fine material is not separated from the air-current it is simply carried around again by the current to the point where the fuel is supplied to the current and then to the point where it is separated from the current. Thus none of the dust or light material is permitted to escape into the atmosphere or into the room where the apparatus is located.

The invention consists, further, in the construction and combinations hereinafter described, and particularly pointed out in the claims.

The invention will be more readily understood by reference to the accompanying drawings, forming part of this specification, and in which—

Figure 1:
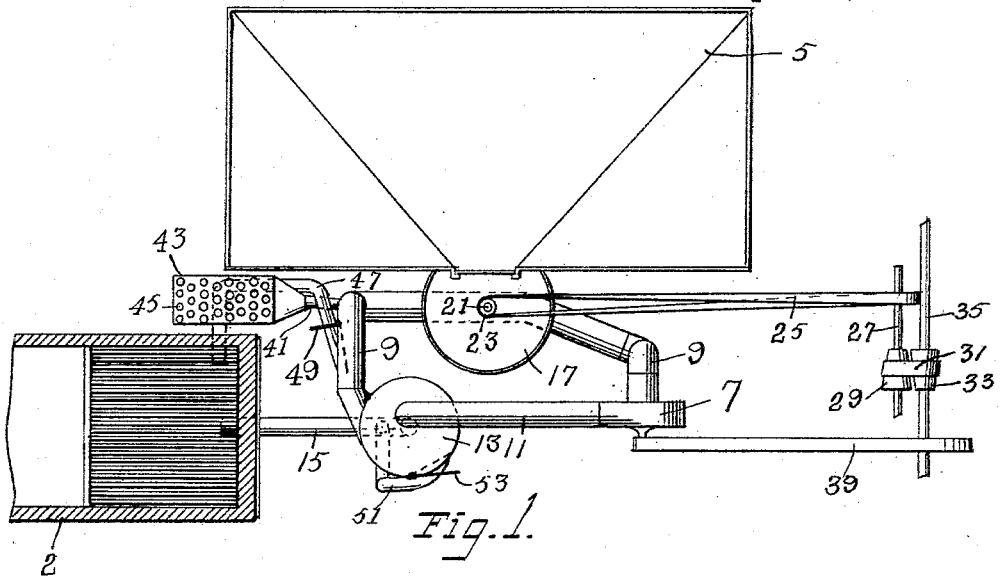
Figure 2:
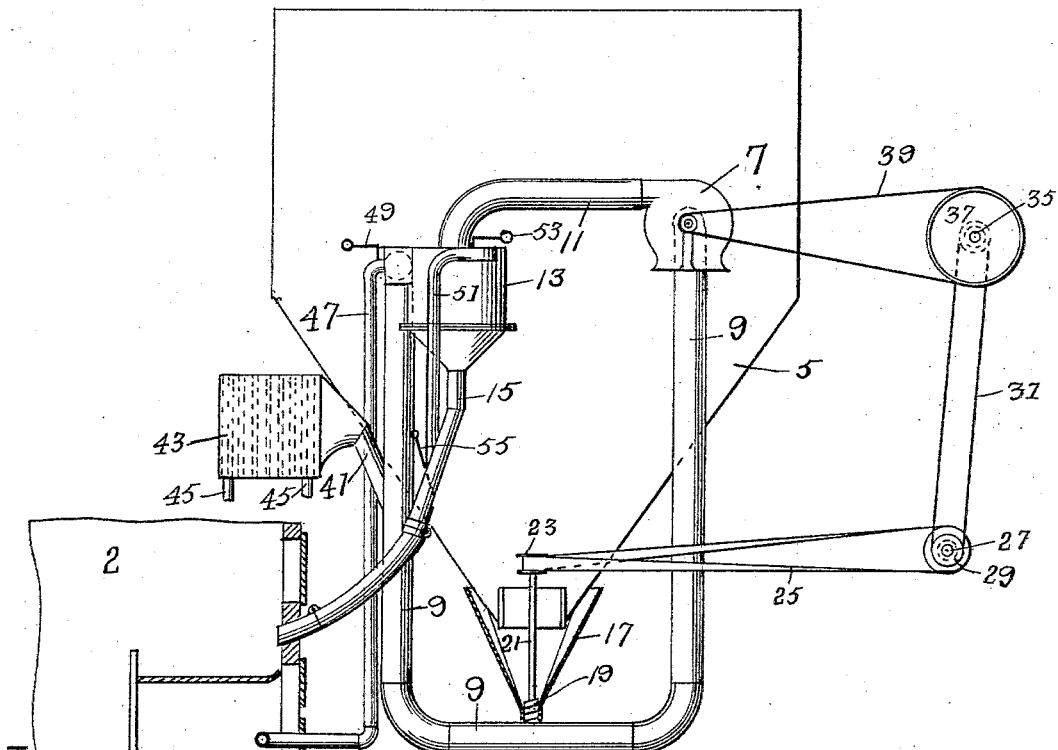

Figure 1 is a plan view of an apparatus embodying my invention, showing its location and connection with the furnace, which is here shown partially in section. Fig. 2 is a side elevation of the same, the furnace being shown partially and in vertical section, and the feed-hopper being also shown in vertical section.

In the accompanying drawings, forming part of this specification, 2 represents a suitable furnace of any ordinary or preferred construction, into which the fuel is to be fed.

5 represents a suitable reservoir or hopper, within which the fuel is placed and from which it is fed, preferably by gravity.

7 represents a fan or blower of any suitable construction provided with a suitable inlet-opening and with an outlet-opening, these openings being connected to suitable pipes 9 and 11. The pipe 11 is connected to a suitable separator 13, and to the air-delivery side of this separator the pipe 9 is also connected.

The fan or blower 7, the pipe 11, the separator 13, and the pipe 9 form means for creating a continuous air-current, the air being passed continuously around the circuit formed by these devices. The separator 13 may be of any suitable or preferred construction. I prefer, however, to use a separator such as shown and described in my patent numbered 513,090, issued January 23, 1894. From the dust or material discharge of the separator 13 is a pipe 15, leading to the furnace 2. This pipe may be of any preferred construction; but I prefer the hinged or jointed pipe shown in Fig. 2 of the drawings.

A hopper 17 is preferably provided beneath the reservoir 5, so that as the material passes from said reservoir it passes into said hopper, from which it is fed into the feed-pipe 9 preferably by means of the screw-feed 19, arranged upon the shaft 21, said shaft being provided with a pulley 23 and being driven by the belt 25 from the shaft 27. The power is applied to the shaft 27 in any suitable manner, and this shaft is preferably provided with a cone-pulley 29, from which a belt 31 extends to a similar pulley 33 upon the shaft 35. The shaft 35 is provided with a pulley 37, and the belt 39 from this pulley to the shaft of the blower serves to operate the blower. For the purpose of supplying to the pipe 9 a sufficient amount of air to compensate for that which will pass through the pipe 15 into the furnace I provide an inlet-pipe 41, the open end of which is preferably arranged above the furnace 2, so that the air which enters said pipe will be more or less warmed by the furnace, or, if preferred, said open end may be connected to a heating-chamber 43, provided with heating-pipes 45, so that the air will first pass through said chamber 43 before entering the open end of the pipe 41. In this manner the air that is supplied to the furnace will be more or less heated, thereby preventing the delivery of cold air to the furnace. I may also supply means for supplying air beneath the grate of the furnace and taking such air from the pipe 9, as shown in the drawings, in which I have shown a pipe 47, connected to the pipe 9, said pipe 9 being provided with a suitable valve having an operating-handle 49, and the pipe 47 extending into the furnace preferably below the grate. By operating the handle 49 the valve within the pipe 9 may be set so as to direct any desired amount of air into the pipe 47. This pipe may, however, be wholly omitted, if preferred. I also prefer to provide a pressure-regulating pipe 51, that is connected to the side of the separator, preferably near the top thereof, as shown in the drawings, and the entrance to which is regulated by a suitable valve having a handle 53, by means of which the amount of air which enters the pipe 51 may be regulated. This pipe connects with the pipe 15 below the separator. By this means the strength of the air-current passing through the pipe 15 into the furnace may be increased or diminished as desired.

I do not confine myself to the use of any particular form of separator, as a separator of any construction by which the fuel will to a greater or less extent be separated from the air-current may be employed, nor do I confine myself to any particular form or arrangement of the means for feeding the fuel to the air-pipe, and said connection may obviously be to the pipe 11 at a point between the fan and the separator instead of being to the pipe 9. Where it is not necessary to heat the air which passes to the furnace with the fuel, the pipe 41 or compensatory air-inlet may be arranged at any convenient point.

Having thus described my invention, I claim as new and desire to secure by Letters Patent—

1. Means for feeding fuel to furnaces, comprising in combination, means for producing a continuous air-current or air-belt, means for directing the fuel into said air-current, and means for separating the fuel from said air-current and directing it into a suitable furnace.

2. Means for feeding fuel to furnaces, comprising in combination, mechanism for producing an air-belt or continuous air-current, means for feeding the fuel into said current, means for separating the fuel from said current and directing it into a suitable furnace, and means for supplying air to said air-belt to take the place of the air which passes into the furnace with the fuel.

3. Means for feeding fuel to furnaces, comprising in combination, a fan or blower, a separator, pipes connecting said fan and separator, whereby a continuous air-current or air-belt may be produced, means for delivering fine fuel into one of said pipes, to be separated from said air-current by said separator, and means for conducting such fuel from said separator to said furnace.

4. The combination, with the fan, of the separator, the pipes connecting said fan and said separator, whereby a continuous air-current may be produced, a pipe extending from said separator to the furnace, and means for feeding the fuel into one of the pipes connecting the fan and separator, for the purpose specified.

5. The combination, with the fan and separator, of the pipes connecting said fan and separator, means for supplying air to one of said pipes, a pipe connecting the separator with the furnace, and means for feeding the fuel into one of the pipes between the fan and separator.

6. The combination, with the fan and separator, of pipes connecting said fan and separator, whereby a continuous air-current may be formed, means for feeding the fuel from the separator to the furnace, and means for supplying heated air to the pipe between the separator and the fan, to compensate for that which passes through the pipe into the furnace, and means for feeding the fuel into one of the pipes between the fan and the separator.

In testimony whereof I have hereunto set my hand this 8th day of January, A. D. 1896.

HENRY L. DAY.

In presence of—
RICHARD PAUL,
M. E. GOOLEY.